United States Patent [19]

Waterland III

[11] Patent Number: 4,823,229
[45] Date of Patent: Apr. 18, 1989

[54] CANOPY DRYSEAL

[76] Inventor: Alfred F. Waterland III, 40 Plum Point Rd., Elkton, Md. 21921

[21] Appl. No.: 85,514

[22] Filed: Aug. 13, 1987

[51] Int. Cl.$^4$ .................. B64C 1/14; F16J 15/10; H05F 1/00
[52] U.S. Cl. .................. 361/218; 174/35 GC; 244/129.3; 244/131; 277/205; 277/207 R; 277/227; 277/901; 361/216; 361/220
[58] Field of Search ............... 277/205, 214, 215, 227, 277/228, 235 R, 901, 166, 227, 207 R; 244/129.3, 129.4, 131, 133; 296/93; 52/208, 716, 397, 400; 49/488, 496, 475, 441; 174/110 FC, 35 GC; 361/218, 220, 216

[56] References Cited

U.S. PATENT DOCUMENTS

| | | | |
|---|---|---|---|
| 2,696,451 | 12/1954 | Snyder | 244/129.3 X |
| 2,784,926 | 3/1957 | Bonza et al. | 244/129.3 |
| 2,793,406 | 5/1957 | Focht | 49/488 |
| 2,808,355 | 10/1957 | Christie et al. | 244/129.3 X |
| 2,939,186 | 6/1960 | Norwood | 52/208 X |
| 2,951,721 | 9/1960 | Asp | 277/227 X |
| 3,005,658 | 10/1961 | McKinney | 49/441 |
| 3,349,533 | 10/1967 | Gregoire | 52/397 |
| 3,400,954 | 9/1968 | Brown | 277/166 X |
| 3,555,168 | 1/1971 | Frykberg | 174/35 GC |
| 3,752,899 | 8/1973 | Bakker | 277/228 X |
| 4,284,677 | 8/1981 | Herliczek | 244/129.3 X |
| 4,399,317 | 8/1983 | VanDyk Jr. | 174/35 GC |

FOREIGN PATENT DOCUMENTS 781605 8/1957 United Kingdom .......... 174/35 GC

OTHER PUBLICATIONS

Tecknit Catalog 8565-69, 129 Dermody St. Cranford, N.J. 07016, Technical Wire Products Inc., 1969, (Cover page and Page 2 only), EECO Shield, EMI/RFI (Conductive Plastic), Gaskets Emerson & Cuming, Inc., Canton, Mass. 1969.

*Primary Examiner*—Allan N. Shoap

[57] ABSTRACT

This invention relates to a seal for an aircraft canopy having a compressible, resilient core and is encapsulated by a low-density, electrically conductive polymeric tape and to a method for making the seal.

7 Claims, 2 Drawing Sheets

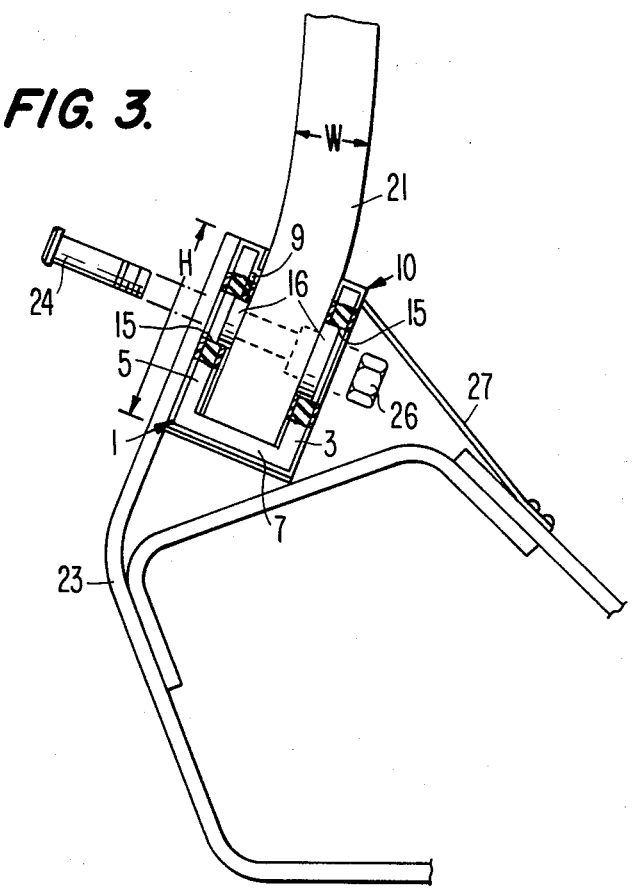
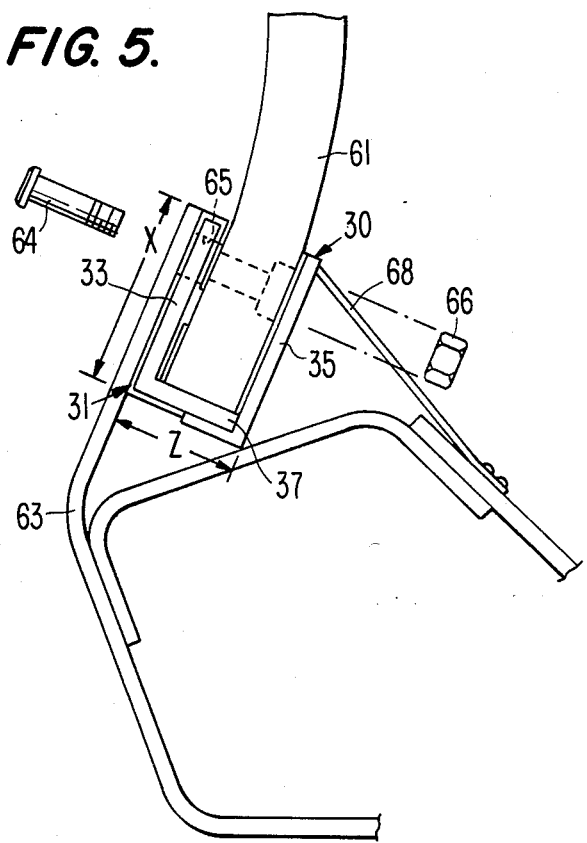

CANOPY DRYSEAL

BACKGROUND

1. Field of the Invention

This invention relates to a pre-formed seal for an aircraft canopy having a compressible, resilient core which is encapsulated with a low-density, electrically conductive polymeric tape and to a method for making the seal.

2. Description of Prior Art

Conventional technology on sealing devices for the aircraft industry often requires messy liquids to be utilized in order to achieve an air-tight seal for canopies in aircraft. Use of messy liquids in such an application often results in problems with production and performance and requires long periods of time for the liquids to set. Multiple parts must be glued together as the canopy is attached to the framework which also requires long periods of time for the various parts to set.

Weatherproof seals described in the prior art are commonly used for vehicle closures and are designed to prevent entry of rainwater and to prevent whistling noise. These seals often require complicated and interlocking rigid parts for attachment to other surfaces. They are designed generally with foam cores that can withstand maximum amounts of compression and for routine cycles of breaking seals and re-sealing of parts such as window panes in vehicles.

BRIEF DESCRIPTION OF THE DRAWINGS

FIG. 3 is a partial end elevational view of the aircraft canopy seal fitted to the aircraft canopy;

FIG. 5 is a schematic view of the second embodiment seal fitted to the aircraft canopy.

SUMMARY OF THE INVENTION

A pre-formed canopy seal is provided comprising a compressible resilient core having two vertical legs interconnected by a horizontal base member and a stress intensifier strip. The core is partially encapsulated with electrically conductive polymeric tape. An alternative embodiment consists of a core having one vertical leg, a vertical polymeric flap, a horizontal base member and a stress intensifier strip. The seal is preferably used with aircraft canopies.

DETAILED DESCRIPTION OF PREFERRED EMBODIMENTS WITH REFERENCE TO THE DRAWINGS

A canopy seal is provided comprising a compressible core having at least one vertical leg connected to a horizontal base member and a stress intensifier strip. A second vertical member including a second vertical leg or a polymeric flap is also connected to the base member thereby forming a core. The core is partially encapsulated with electrically conductive polymeric tape to form a leakproof and airtight canopy seal for use in aircraft canopies. The invention is best understood by reference to the drawings.

Figure 1:
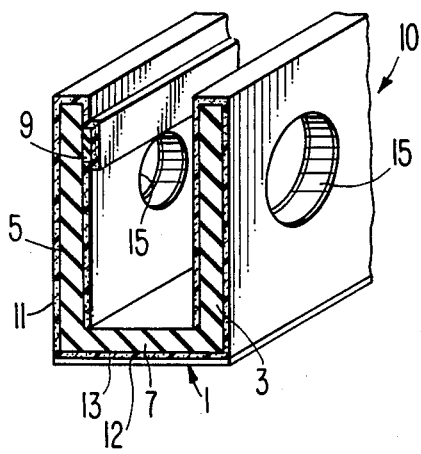
FIG. 1 is a pictorial cross-sectional view of a portion of the seal constructed in accordance with the invention.

FIG. 1 illustrates in cross-section a canopy seal 10 according to the present invention with an aircraft canopy and its supporting framework. The seal 10 comprises a compressible resilient core 1 made preferably from silicone rubber. Other materials capable of withstanding and performing over a wide temperature range may be substituted for silicone rubber. The core is further comprised of two vertical legs, one designated as an outer leg 3 and an inner leg 5 and a horizontal base member 7 interconnected between the two vertical legs so as to form a U-shaped channel. The resilient core may be produced manually by forming an extruded channel of silicone rubber to the desired dimensions to form a tight seal around an aircraft canopy 21. An alternative method to produce the resilient core 1 is by injection molding. The core must be of a material that is capable of performing over a wide temperature range from about $-65°$ F. to $+265°$ F.

The core has a row of apertures 15 cut through the vertical legs of the core, along length so that bolts may be inserted therethrough.

A narrow strip of low density polymeric tape 9 is bonded by an adhesive to the inside edge of the inner leg 5 of the core and above or below the row of apertures 15. In FIG. 1, the strip is located above the row of apertures 15. The narrow strip is used as a stress intensifier strip and must seal with the inner edge of a canopy. The stress intensifier strip 9 is approximately the same length as the canopy to be sealed. The stress intensifier is preferably made of low density expanded PTFE. The strip width is determined by insuring that the bolt load applied to the length and width of the stress intensifier strip creates an adequate stress on it to insure a tight seal.

Low density electrically conductive polymeric tape 11 is then wrapped around the core surrounding both sides and tops of legs 3 and 5, and stress intensifier strip 9, as well as the bottom side of base member 7 so as to partially encapsulate the core. The tape is secured to the core by a silicone-based adhesive. The inner side of base member 7 may also be optionally covered with the polymeric tape but is preferably not so as to minimize the thickness of the base member. This allows for proper fit with the existing aircraft framework. An additial strip 13 of the same electrically conductive polymeric tape may be placed on the outer side of base 7 so as to cover any seams 12. A preferred low density, electrically conductive polymeric tape 11 is expanded polytetrafluoroethylene (PTFE) filled with a conductive filler such as carbon black. The tape, also known as Electro-Magnetic Interference (EMI) Shielding GORE-TEX® gasket tape is available from W. L. Gore and Associates, Inc. The electrically conductive polymeric tape serves as a continuous static ground between the canopy and airframe and barrier against electro-magnetic interference. The tape is bonded by a silicone-based adhesive that is capable of maintaining a bond through a broad range of temperatures. A preferred silicone-based adhesive is commercially available from the General Electric Company.

Figure 1A:
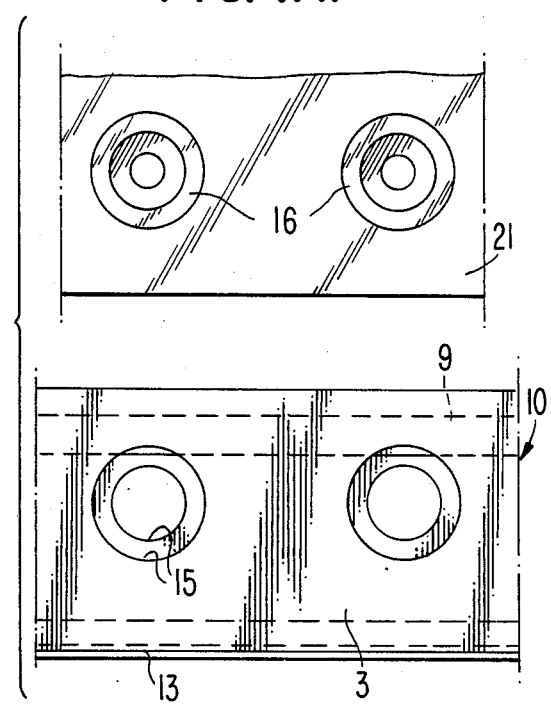
FIG. 1a is an exploded side elevational view of a portion of the canopy seal of this invention and the aircraft canopy.

FIG. 1a shows an exploded side elevational view of the canopy 21 containing bushings 16 for bolt attachment and the canopy seal 10 showing the apertures 15 cut to overlap the bushing site. Thus the canopy seal 10 is affixed to the canopy 21 and supporting framework 23 (shown in FIG. 3) by preferably a means for bolting through the seal 10, bushings 16 and supporting framework 23 along the length of the canopy.

Figure 2:
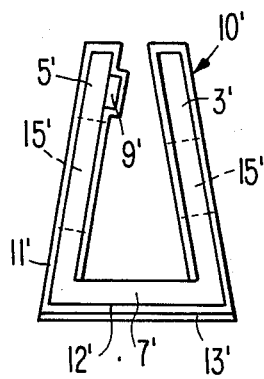
FIG. 2 is an end elevational view of an alternate configuration of the seal constructed in accordance with the invention.

FIG. 2 is an end elevational view of the aircraft canopy seal 10' in an alternate U-shaped core embodiment. In this embodiment, the outer leg 3' and inner leg 5' are inclined inward towards each other. The electrically conductive polymeric tape 11' is wrapped around the core in a manner similar to that described above for the previous embodiment.

FIG. 3 illustrates a partial end elevational view of the aircraft canopy 21 and framework 23 including the canopy seal 10 constructed in accordance with the present invention. As can be seen from FIG. 3, the dimensions of the U-shaped core vary and are dependent on the design of the canopy 21 and aircraft framework 23 so that a leak-proof seal is achieved. The height of the vertical leg 5 is equivalent to the height (H) of the supporting framework. The height of vertical leg 3 is approximately the same height as leg 5 and should be in contact with faring 27 extending from the framework. The width of base member 7 between the vertical legs 3 and 5 is determined by the width (W) of the canopy 21 which is positioned between the legs and within the seal 10. The thickness of each of the vertical legs 3 and 5 must be of sufficient dimension so as to optimize bolt torque-induced compression and to ensure complete contact between the canopy bushing 16 projecting through the canopy to the supporting framework 23.

The preferred means for attaching the seal 10 between the canopy 21 and framework 23 is by a series of bolts 24 and nuts 26. A bolt 24 is slipped through each aperture 15 of the seal from the framework to make contact with the aircraft canopy 21. The means for attaching the canopy, canopy seal, and framework are positioned along the entire length of the canopy.

A faring 27 extends from the framework 23 and contacts the upper outside edge of vertical leg 3 to provide further reinforcement to the canopy seal 10 whereby water is prevented from entering the seal.

Figure 4:
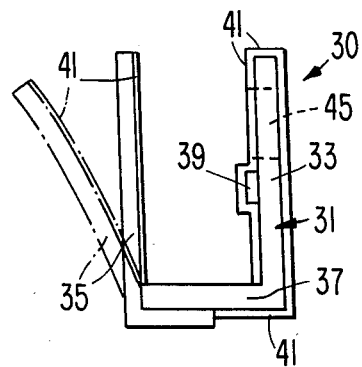
FIG. 4 is an end elevational view of a seal of a second embodiment constructed in accordance with the invention.
Figure 4A:
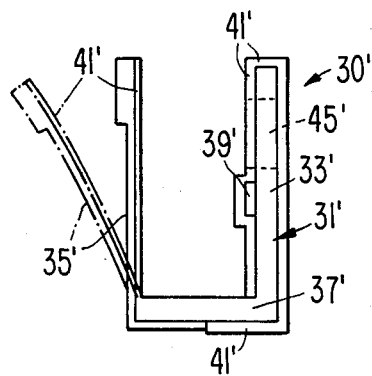
FIG. 4a is an end elevational view of an alternate configuration of the seal of a second embodiment.

FIGS. 4 and 4a illustrate second embodiments of a canopy seal made in accordance with the invention. With reference to FIG. 4, a seal 30 comprises a compressible resilient core 31 made preferably from silicone rubber or any other compressible material capable of withstanding and performing within a wide temperature range from between −65° F. to +265° F. The core is further comprised of one vertical leg 33 and base member 37 located at the bottom of the vertical leg 33 so as to form an L-shaped core.

FIG. 4 shows a seal with a second vertical member comprised of a thick flap of uniform thickness 35 made of electrically conductive polymeric material affixed, preferably by an adhesive to the base member 37 and rising parallel to vertical leg 33.

FIG. 4a shows a seal 30, also having a second vertical member comprising a thick flap 35' that is thicker in the region in which there is contact with faring 68 (faring 68 is shown in FIG. 5). An L-shaped core 31' comprised of vertical leg 33' and base member 37' is also shown in FIG. 4a.

A thin strip of low density polymeric tape 39 identified as the stress intensifier strip is affixed to the vertical leg 33 at a location on the leg 33 that is immediately above or below the bolt aperture 45. The stress intensifier strip is preferably made of low density expanded PTFE.

Thin low density electrically conductive polymeric tape 41 that serves as a continuous static ground and barrier against electro-magnetic interference is wrapped around the core 31 surrounding the entire length of leg 33 stress intensifier strip 39, and a substantial fraction of the exterior surface of base member 37. Similar to the previous embodiment, preferablyno tape should cover the interior surface of base member 37 so as to minimize base thickness. The low density polymeric tape covering the base 37 should abut or slightly overlap flap 35 to form a seam. A preferred low density polymeric tape is EMI Shielding GORE-TEX® Gasket Tape available from W. L. Gore and Associates. The flap 35, having uniform width or the flap having a thicker region in the upper portion 35' is also preferably made of EMI Shielding GORE-TEX™ Gasket Tape. The flap should be affixed directly to the canopy of the aircraft so that it is leakproof. This can be accomplished preferably with the use of a pressure sensitive adhesive. Similar to the previously described embodiment, a row of apertures 45 are made into the vertical leg 33 of the seal along the length of the seal for bolt attachment.

FIG. 5 illustrates a partial side elevational view of the aircraft canopy in which the canopy seal 30 having a flap 35 of uniform thickness is fitted to the canopy 61 and aircraft framework 63. Similar to the U-shaped embodiment, previously described, the dimensions of the L-shaped core 31 vary and are dependent on the design and size of the aircraft canopy 61 and framework 63 so that a leak-proof seal is achieved. The height of the vertical leg 33 is dependent on the height (X) of the supporting framework. Similarly, the size of base member 37 is dependent on the width (Z) of the framework 63 and canopy 61 so that the seal can fit snugly within the framework. The height of the flap 35 should be of sufficient size so that it comes into contact with faring 68 which extends from the framework and provides additional support in creating a leakproof seal.

Flap 35 is affixed to the canopy 61 preferably by a pressure sensitive adhesive. The canopy seal 30 is fitted within the framework 63 and the canopy 61 thereupon fits within the seal. The preferred means for attaching the canopy, canopy seal and framework together is by bolting. A series of bolts 64 are slipped from the framework through the seal aperture 45, and canopy bushings 65 and secured by a nut 66. The bolting means are used along the length of the framework to secure the framework, canopy seal, and canopy.

While the invention has been disclosed herein in connection with certain embodiments and detailed descriptions; it will be clear to one skilled in the art that modifications or variations of such details can be made without deviating from the gist of the invention, and such modifications or variations are considered to be within the scope of the claims herein below.

I claim:

1. A canopy seal for use between an aircraft canopy and its framework comprising: resilient compressible core having at least one vertical leg with an inner and outer edge and with a row of apertures cut into said leg; a horizontal base member interconnected with the vertical leg to form an L-shaped channel; a second vertical member attached to the horizontal base member; and a low density polymeric stress intensifier bonded to the inner edge of the vertical leg, said core and intensifier strip being partially encapsulated by electrically conductive polymeric tape.

2. A canopy seal for use between an aircraft canopy and its framework as claimed in claim 1 wherein said second vertical member is a second vertical leg.

3. An aircraft canopy seal as claimed in claim 2 wherein the vertical legs are inclined toward each other.

4. An aircraft canopy seal for use between a canopy and its framework as claimed in claim 1 wherein said second vertical member is an electrically conductive polymeric flap.

5. An aircraft canopy seal as in claim 1 in which the polymeric tape and electrically conductive polymeric tape are expanded PTFE filled with a conductive material.

6. An aircraft canopy seal as in claim 1 in which the compressible resilient core is a silicon rubber.

7. An aircraft canopy seal as in claim 1, wherein said stress intensifier strip is expanded PTFE.

* * * * *